United States Patent
Pansare et al.

(10) Patent No.: US 9,486,782 B2
(45) Date of Patent: *Nov. 8, 2016

(54) LOW TEMPERATURE SULFUR TOLERANT TAR AND SULFUR REMOVAL WITH CONCOMITANT SYNTHESIS GAS CONDITIONING

(71) Applicant: Lummus Technology Inc., Bloomfield, NJ (US)

(72) Inventors: Sourabh S. Pansare, Bartlesville, OK (US); Joe D. Allison, Bartlesville, OK (US); Steven E. Lusk, Ponca City, OK (US); Albert C. Tsang, Sugar Land, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,415

(22) Filed: Dec. 22, 2014

(65) Prior Publication Data

US 2015/0105248 A1    Apr. 16, 2015

Related U.S. Application Data

(62) Division of application No. 13/231,319, filed on Sep. 13, 2011, now Pat. No. 8,945,424.

(60) Provisional application No. 61/382,211, filed on Sep. 13, 2010.

(51) Int. Cl.
| | |
|---|---|
| *B01J 21/04* | (2006.01) |
| *B01J 23/80* | (2006.01) |
| *C01B 3/58* | (2006.01) |
| *C10K 1/00* | (2006.01) |

(52) U.S. Cl.
CPC ............ *B01J 23/80* (2013.01); *B01J 21/04* (2013.01); *C01B 3/58* (2013.01); *C10K 1/002* (2013.01); *C10K 1/004* (2013.01); *C01B 2203/045* (2013.01); *C01B 2203/0435* (2013.01);

(Continued)

(58) Field of Classification Search
CPC ....................................................... B01J 21/04
See application file for complete search history.

(56) References Cited

U.S. PATENT DOCUMENTS

| | | | | |
|---|---|---|---|---|
| 4,990,318 A | * | 2/1991 | Kidd ................ | B01D 53/48 210/749 |
| 5,244,641 A | * | 9/1993 | Khare ............... | B01D 53/02 423/220 |
| 8,236,262 B2 | * | 8/2012 | Potter .............. | B01J 20/02 208/208 R |

(Continued)

FOREIGN PATENT DOCUMENTS

| | | |
|---|---|---|
| CA | 2381983 A1 | 3/2001 |
| CN | 1613557 A | 5/2005 |

(Continued)

OTHER PUBLICATIONS

Notice of Reasons for Rejection issued Jul. 29, 2015 in corresponding Japanese application No. 2013-528383 (w/translation) (8 pages).

(Continued)

*Primary Examiner* — Wayne Langel
(74) *Attorney, Agent, or Firm* — Osha Liang LLP

(57) ABSTRACT

A catalyst comprising of NiO; $Al_2O_3$; and ZnO. The catalyst is capable of greater than 5% sulfur removal from a synthesis gas at a temperature range from 300° C. to 600° C.

13 Claims, 2 Drawing Sheets

(52) U.S. Cl.
CPC .......... *C01B2203/0465* (2013.01); *C01B 2203/0485* (2013.01)

(56) References Cited

U.S. PATENT DOCUMENTS

| | | | |
|---|---|---|---|
| 8,314,047 B2 * | 11/2012 | Macleod | B01D 53/8609 423/244.02 |
| 8,945,424 B2 * | 2/2015 | Pansare | B01J 21/04 252/373 |
| 2012/0021305 A1 * | 1/2012 | Nagayasu | B01J 20/0225 429/410 |

FOREIGN PATENT DOCUMENTS

| | | | |
|---|---|---|---|
| DE | 2232027 A1 | 1/1973 | |
| EP | 0401789 A1 | 12/1990 | |
| GB | 2279583 A | 1/1995 | |
| JP | 2006-225615 A | 8/2006 | |
| SU | 959821 A1 | 9/1982 | |
| WO | 2009112855 A1 | 9/2009 | |
| WO | 2009112856 A1 | 9/2009 | |

OTHER PUBLICATIONS

Office Action issued Jul. 30, 2014 in corresponding Chinese application No. 201180043925.9 (w/translation) (12 pages)—cited in parent U.S. Appl. No. 13/231,319.

Second Office Action issued Mar. 4, 2015 in corresponding Chinese application No. 201180043925.9 (w/translation) (14 pages).

Office Action (w/translation) issued Feb. 19, 2015 in corresponding Japanese application No. 2013-528383 (7 pages).

* cited by examiner

LOW TEMPERATURE SULFUR TOLERANT TAR AND SULFUR REMOVAL WITH CONCOMITANT SYNTHESIS GAS CONDITIONING

CROSS-REFERENCE TO RELATED APPLICATIONS

This application claims benefit pursuant to 35 U.S.C. §120 of U.S. patent application Ser. No. 13/231,319, filed on Sep. 13, 2011, now U.S. Pat. No. 8,945,424, which is incorporated by reference in its entirety, which is a non-provisional application which claims the benefit and priority to U.S. Provisional Application Ser. No. 61/382,211, filed Sep. 13, 2010, entitled "Low Temperature Sulfur Tolerant Tar and Sulfur Removal with Concomitant Synthesis Gas Conditioning," which is hereby incorporated by reference in its entirety.

STATEMENT REGARDING FEDERALLY SPONSORED RESEARCH OR DEVELOPMENT

None.

FIELD OF THE INVENTION

Catalyst for cleaning and conditioning of synthesis gas from tar and sulfur.

BACKGROUND OF THE INVENTION

Synthesis gas has various impurities such as tars, $H_2S$, $NH_3$ and particulates. Tars, commonly defined as polynuclear aromatic compounds formed in the pyrolysis of carbonaceous materials such as wood, coal, or peat, are responsible for operational problems such as plugging of process lines and fouling of heat exchange surfaces which results in reduced process efficiency and plant shutdowns. Tars have the propensity to act as coke precursors resulting in catalyst deactivation downstream of the gasifier. Additionally some components of tars are known carcinogens. Hence, it is important to remove tars from synthesis gas streams for the economical conversion of synthesis gas to value added products.

The concentrations of tars can vary depending upon feedstocks, gasifier type and operating conditions. Most downstream conversion processes and equipments have zero or very low (in ppb range) tolerance for tars. Although catalytic removal of tars is the simplest and the most economical method, there are no commercialized low temperature (<500° C.) tar removal catalysts even after continued 25 years of research and development efforts. Catalysts currently used in the art require temperatures of at least 600° C., preferably 800° C. which requires heating and expensive equipment. By taking the synthesis gas straight out of the generator absent any additional heating additional costs and machinery are not required.

There exists a need to find a simultaneous tar and sulfur removal catalyst that exhibits: 1) sulfur tolerance for tar removal; 2) resistance to coking; 3) ability to withstand high temperatures and reducing environment; 4) ability to work in the presence of $NH_3$, HCl and some heavy metals; and 5) attrition resistance.

BRIEF SUMMARY OF THE DISCLOSURE

A catalyst comprises or comprising essentially of NiO; Al2O3; and ZnO. The catalyst is capable of greater than 5% sulfur removal from a synthesis gas at a temperature range from 300° C. to 600° C.

In an alternate embodiment the catalyst comprises or comprises essentially of NiO present from 1 to 10 wt %; Al2O3; and ZnO. In this embodiment the catalyst is capable of greater than 20% sulfur removal from a synthesis gas while simultaneously removing tar from the synthesis gas at a temperature range from 350° C. to 550° C. and a pressure range from 14.7 to 1,200 psig.

In another embodiment the process begins by producing a synthesis gas. The synthesis gas is then contacted with a catalyst to produce a treated synthesis gas. In this embodiment the catalyst comprises or comprising essentially of NiO; Al2O3; and ZnO. The catalyst is capable of greater than 5% sulfur removal from a synthesis gas at a temperature range from 300° C. to 600° C. The treated synthesis gas is then introduced to a catalytic chemical reaction. In this embodiment the synthesis gas is not heated prior to contact with the catalyst and the treated synthesis gas is not cooled prior to undergoing the catalytic chemical reaction.

In yet another embodiment the process begins by producing a synthesis gas. The synthesis gas is then contacted with a catalyst to produce a treated synthesis gas. In this embodiment the catalyst comprises or comprises essentially of NiO present from 1 to 10 wt %; Al2O3; and ZnO. The catalyst is capable of greater than 20% sulfur removal from a synthesis gas while simultaneously removing tar from the synthesis gas at a temperature range from 350° C. to 550° C. and a pressure range from 14.7 to 1,200 psig. The treated synthesis gas is then introduced to a catalytic chemical reaction. In this embodiment the synthesis gas is not heated prior to contact with the catalyst and the treated synthesis gas is not cooled prior to undergoing the catalytic chemical reaction.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In one embodiment the catalyst comprises NiO; $Al_2O_3$; and ZnO. In this embodiment the catalyst is capable of greater than 5% sulfur removal from a synthesis gas at a temperature range from 300° C. to 600° C.

In one embodiment the NiO is present from 0.5 to 15 wt %, 1 to 10 wt % or even 7.5 to 12.5 wt %.

In another embodiment the ZnO is present from 0.5 to 15 wt %, 1 to 10 wt % or even 7.5 to 12.5 wt %.

Figure 1:
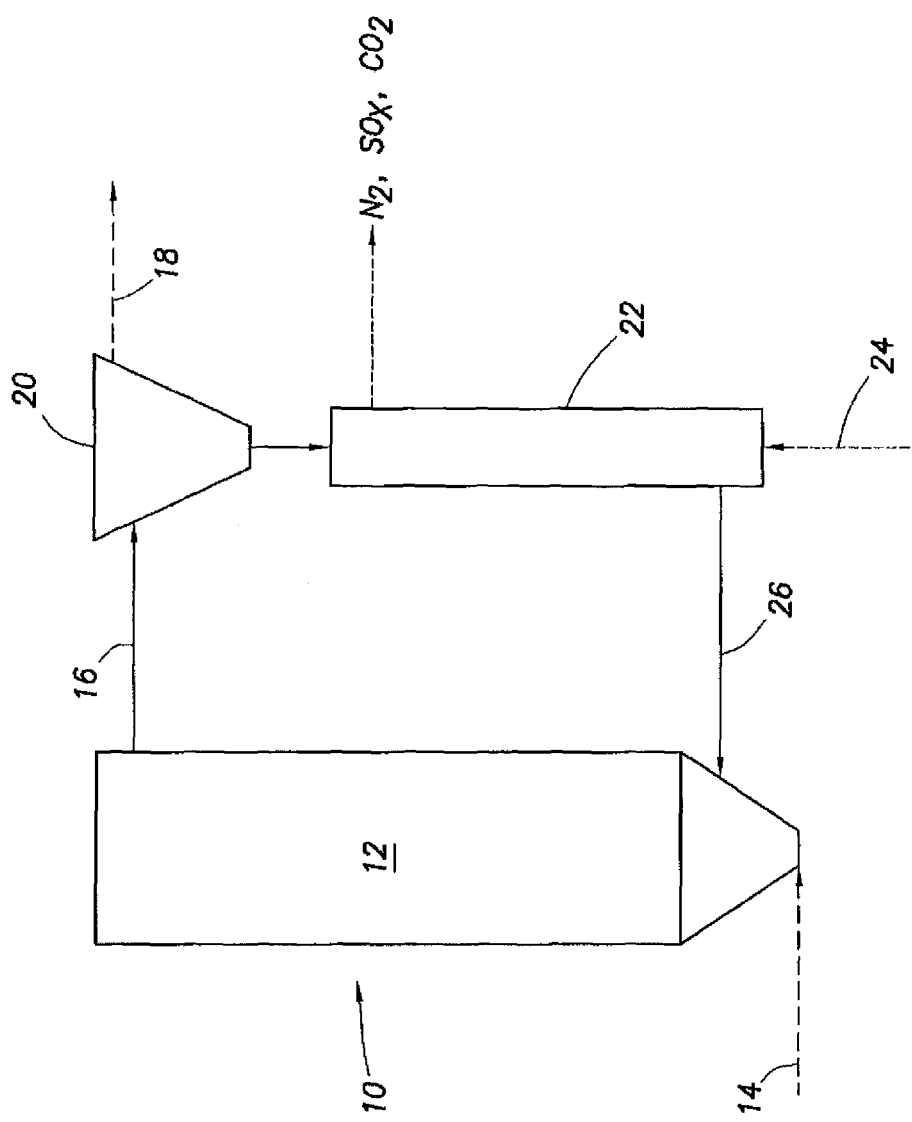
FIG. 1 depicts the setup for a circulating fluidized bed design with a regenerator.

The catalyst can be placed on a fixed bed design or optimally on a circulating fluidized bed design. The reactor setup for this circulating fluidized bed design with a regenerator is shown in FIG. 1. In this figure the fluidized bed reactor 10 contains the catalyst 12. Synthesis gas 14, present with tars and $H_2S$ flow into the fluidized bed reactor 10 and reacted with the catalyst 12. The temperature of this reaction step can be less than 425° C., range from 325° C. to 425° C., or even range from 350° C. to 400° C. The pressure of the reaction can be run from 14.7 to 1,200 psig, spent catalyst 16 and the clean synthesis gas 18 are then flowed into a separator 20, such as a cyclone separator, where they are separated. The spent catalyst 16 then flows into a regenerator 22 where air 24 is utilized to regenerate the catalyst into regenerated catalyst 26. The regenerated catalyst then flows into the circulating fluidized bed design to be used as catalyst once again.

The synthesis gas in which the catalyst is reacted with can be any gas mixture that contains varying amounts of carbon monoxide and hydrogen. In one embodiment the synthesis gas feed can contain tar in the form of naphthalene and sulfur in the form of $H_2S$. The amount of tars and sulfur in the synthesis gas feed can be anywhere between a few ppm to 15,000 ppmv depending upon feedstocks, gasifer type and operating conditions.

In one embodiment the synthesis gas is not heated prior to contacting with the catalyst. Catalysts currently used in the art require temperatures of at least 800° C. which requires heating and expensive equipment. By taking the synthesis gas straight out of the generator absent any additional heating additional costs and machinery are not required. Furthermore by contacting the synthesis gas with the catalyst at a temperature range from 300° C. to 600° C. the treated synthesis gas would not need to be cooled prior to being utilized in a catalytic chemical reaction.

The catalytic chemical reaction can include reactions such as a Fischer Tropsch reaction or a methanation reaction or syngas to dimethyl ether to gasoline. The Fischer-Tropsch reaction can be used to produce liquid fuels. Other catalytic reactions can be used to produce synthetic natural gas, gasoline, alcohols, ammonia or other chemical products.

In one embodiment the metal oxide sites can be reduced causing a combination of reduced metal sites and metal oxide sites. The reduction can be achieved by using hydrogen at moderate temperatures to react with the metal oxide to form water and a reduced metal.

In one embodiment the synthesis gas contain more than, 1,000 ppmv of sulfur even more than 10,000 ppmv or even 15,000 ppmv of sulfur. In one example the amount of sulfur from the synthesis gas can range from 10,000 to 20,000 ppmv. Additionally, in one embodiment the catalyst is capable of removing the $H_2S$ to less than 1 ppmv, which is the level typically required for Fischer-Tropsch reactions.

In another embodiment the catalyst comprises from 1-10 wt % NiO; $Al_2O_3$; and ZnO. The catalyst is capable of greater than 20% sulfur removal from a synthesis gas while simultaneously removing tar from the synthesis gas at a temperature range from 350° C. to 550° C. and a pressure range from 14.7 to 1,200 psig or even 250 to 1,000 psig.

In yet another embodiment the process discloses producing a synthesis gas followed by producing a treated synthesis gas by contacting the synthesis gas with a catalyst. In this embodiment the catalyst can comprise NiO; $Al_2O_3$; and ZnO. The treated synthesis gas is then introduced into a catalytic chemical reaction. In this embodiment the synthesis gas is not heated prior to contact with the catalyst and the treated synthesis gas is not cooled prior to undergoing the catalytic chemical reaction.

By not heating the synthesis gas prior to contact with the catalyst additional heating sources are not required. Furthermore additional cooling of the treated synthesis gas is not required prior to the treated synthesis gas undergoing a catalytic chemical reaction.

In another embodiment the process discloses producing a synthesis gas followed by producing a treated synthesis gas by contacting the synthesis gas with a catalyst. In this embodiment the catalyst can comprise from 1-10 wt % NiO; $Al_2O_3$; and ZnO. The catalyst is capable of greater than 20% sulfur removal from a synthesis gas while simultaneously removing tar from the synthesis gas at a temperature range from 350° C. to 550° C. and a pressure range from 250 to 1,000 psig. The treated synthesis gas is then introduced into a catalytic chemical reaction. In this embodiment the synthesis gas is not heated prior to contact with the catalyst and the treated synthesis gas is not cooled prior to undergoing the catalytic chemical reaction.

The following examples of certain embodiments of the invention are given. Each example is provided by way of explanation of the invention, one of many embodiments of the invention, and the following examples should not be read to limit, or define, the scope of the invention.

Example 1

A catalyst was evaluated comprising of 17 wt % Ni and ZnO over an alumina-perlite support. The catalyst was evaluated for naphthalene tar removal at 500 psig and in the temperature range from 350 to 400° C. The synthesis gas stream consisted of 28.5% $H_2$, 42% CO, 12% $CO_2$, 16% $H_2O$ 1.5% $H_2S$ (equivalent to 15,000 ppmv of $H_2S$) and approximately 200 ppmv of naphthalene. The catalyst was reduced in the presence of $H_2$ at 450° C. and an atmospheric pressure for 1.5 hours before starting the reaction. The reaction conditions were 350° C. at 500 psig and 11 $h^{-1}$.

Figure 2:
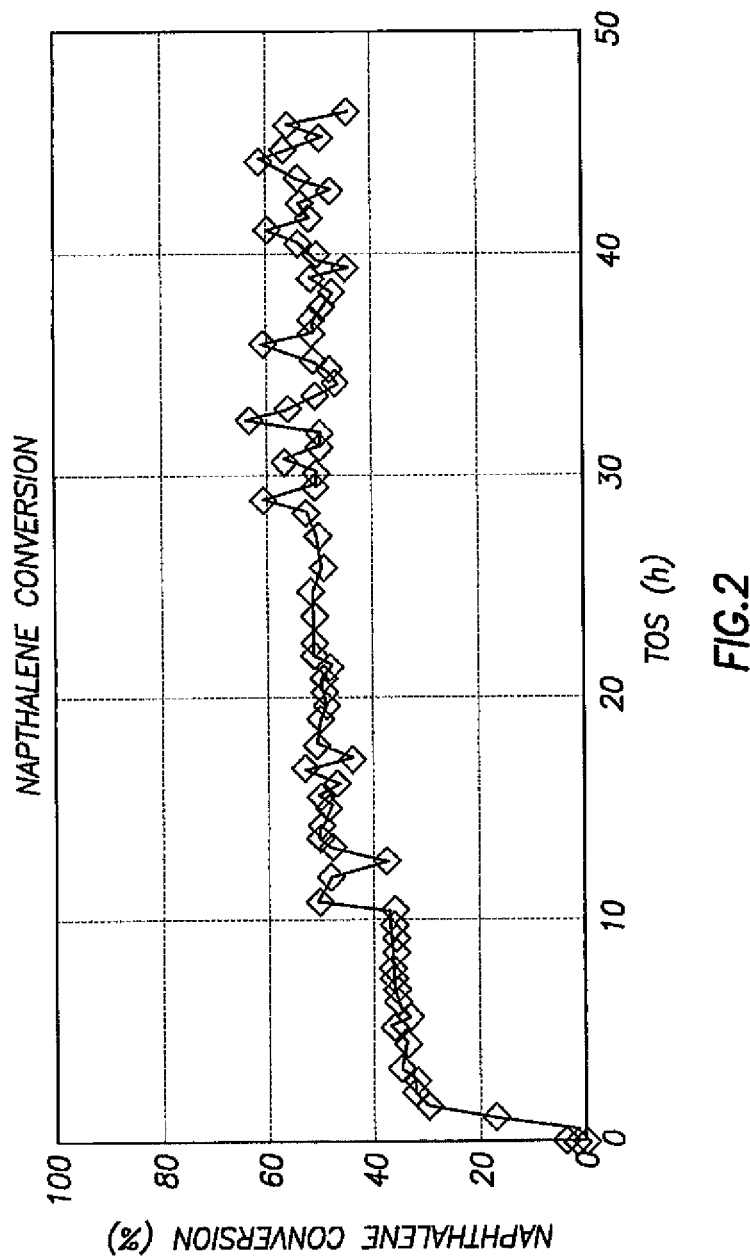
FIG. 2 depicts the naphthalene conversion at 500 psig and 11 $h^{-1}$ at 350° C.

As shown in FIG. 2, 50% naphthalene conversion at the reaction conditions remained constant for 2 days. There were no signs of deactivation of the catalyst. Methane and coke were the main products of the reaction and about 9 wt % carbon was present on the spent catalyst. The analysis of spent catalyst also indicated that it had 21 wt % of sulfur, therefore the catalyst was removing tar and $H_2S$ simultaneously. Additionally, the catalyst is shown to be active for sulfur removal in the presence of $NH_3$ and HCl without any degradation effects.

Example 3

Different catalysts were tested to evaluate their ability for tar cracking, methanation, water gas shift and sulfur removal at low temperatures. In the following tables WHSV means weight hourly space velocity.

Six different catalysts were tested

| Catalyst | Types of sites | Form of metal sites |
|---|---|---|
| Silica-alumina | Acidic sites | — |
| Tungstated zirconia | Acidic sites, some metal | Reduced metal/oxide |
| Ultra-stable Y zeolite | Acidic sites | — |
| NiW/zeolitic support | Metal and acid sites | Sulfide |
| NiMo/zeolitic support | Metal and acid sites | Sulfide |
| Ni, $Al_2O_3$, and ZnO | Metal sites | Reduced metal/oxide |

The ability for the catalysts to perform tar cracking is shown below.

| Catalyst | Temp. range ° C. | Pressure psig | WHSV h-1 | Naphthalene Conversion % |
|---|---|---|---|---|
| Silica-alumina | 400-600 | 500 | 11 | <20% |
| Tgstated zirconia | 400-600 | 500 | 11 | 10-60% |
| Ultra-stable Y zeolite | 400-600 | 500 | 11 | 40-60% |
| NiW/zeolitic support | 400-600 | 500 | 11 | 60-75% |
| NiMo/zeolitic support | 350-550 | 500 | 2.2-11 | >90% |
| Ni, Al2O3, and ZnO | 350-550 | 500 | 11 | 20-60% |

The ability for the catalysts to perform methanation is shown below.

| Catalyst | Temp. range ° C. | Pressure psig | WHSV h−1 | Rate of CH4 formation μmole/g cat/s |
|---|---|---|---|---|
| Silica-alumina | 400-600 | 500 | 11 | <20 |
| Tungstated zirconia | 400-600 | 500 | 11 | 100-400 |
| Ultra-stable Y zeolite | 400-600 | 500 | 11 | <10 |
| NiW/zeolitic support | 400-600 | 500 | 11 | 300-700 |
| NiMo/zeolitic support | 350-550 | 500 | 2.2-11 | 150-800 |
| Ni, Al2O3, and ZnO | 350-550 | 500 | 11 | <20 |

The ability for the catalysts to perform water gas shift reactions is shown below.

| Catalyst | Temp. range ° C. | Pressure psig | WHSV h−1 | CO Conversion % |
|---|---|---|---|---|
| Silica-alumina | 400-600 | 500 | 11 | <5% |
| Tungstated zirconia | 400-600 | 500 | 11 | 20% |
| Ultra-stable Y zeolite | 400-600 | 500 | 11 | <5% |
| NiW/zeolitic support | 400-600 | 500 | 11 | 30% |
| NiMo/zeolitic support | 350-550 | 500 | 2.2-11 | 30-50% |
| Ni, Al2O3, and ZnO | 350-550 | 500 | 11 | 10-20% |

The ability for the catalysts to perform sulfur removal is shown below.

| Catalyst | Temp. range ° C. | Pressure psig | WHSV h−1 | Sulfur uptake |
|---|---|---|---|---|
| Silica-alumina | 400-600 | 500 | 11 | 0 |
| Tungstated zirconia | 400-600 | 500 | 11 | 3% |
| Ultra-stable Y zeolite | 400-600 | 500 | 11 | 0 |
| NiW/zeolitic support | 400-600 | 500 | 11 | <0.1% |
| NiMo/zeolitic support | 350-550 | 500 | 2.2-11 | <0.1% |
| Ni, Al2O3, and ZnO | 350-550 | 500 | 11 | 20% |

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A catalyst for treating a raw synthesis gas comprising:
   (a) 7.5 to 12.5 wt. % NiO;
   (b) $Al_2O_3$; and
   (c) 7.5 to 12.5 wt % ZnO,
   wherein the catalyst is simultaneously capable of greater than 5% sulfur removal and 20% to 60% tar removal from a synthesis gas containing tar and sulfur-containing compounds at a temperature in a range from 300° C. to 600° C.

2. The catalyst of claim 1, wherein the catalyst is capable of greater than 55% tar conversion at 350° C.

3. The catalyst of claim 1, wherein NiO is present from 7.5 to 10 wt %.

4. The catalyst of claim 1, wherein the catalyst is capable of sulfur removal from the synthesis gas at greater than 10%.

5. The catalyst of claim 1, wherein the catalyst is configured to be used in a circulating fluidized bed reactor.

6. The catalyst of claim 1, wherein at least one of Ni and Zn are present as both reduced metal sites and metal oxide sites.

7. The catalyst of claim 6, wherein the reduced metal sites comprise the hydride form of the metal.

8. A catalyst comprising of:
   (a) 7.5 to 12.5 wt % NiO;
   (b) $Al_2O_3$; and
   (c) 7.5 to 12.5 wt % ZnO,
   wherein the catalyst is capable of greater than 20% sulfur removal from a synthesis gas while simultaneously removing 20% to 60% of tar from the synthesis gas at a temperature range from 350° C. to 550° C. and a pressure range from 14.7 to 1,200 psig.

9. The catalyst of claim 8, wherein the catalyst is configured to be used in a circulating fluidized bed reactor.

10. The catalyst of claim 8, wherein at least one of Ni and Zn are present as both reduced metal sites and metal oxide sites.

11. The catalyst of claim 10, wherein the reduced metal sites comprise the hydride form of the metal.

12. A catalyst for treating a raw synthesis gas, the catalyst comprising:
   (a) a mixture of nickel oxide and nickel hydride;
   (b) a mixture of zinc oxide and zinc hydride; and
   (c) $Al_2O_3$;
   wherein the catalyst comprised nickel oxide in an amount in a range from 7.5 to 12.5 wt % and zinc oxide in an amount in a range from 7.5 to 12.5 wt % prior to reducing a portion of the nickel oxide and zinc oxide with hydrogen.

13. The catalyst of claim 12, wherein, at a temperature in a range from 300° C. to 600° C., the catalyst is simultaneously capable of sulfur removal and tar removal from a raw synthesis gas containing tar and sulfur-containing compounds.

* * * * *